(12) United States Patent
Vovos et al.

(10) Patent No.: US 12,394,978 B2
(45) Date of Patent: Aug. 19, 2025

(54) ARC DETECTION FOR HIGH VOLTAGE SYSTEM

(71) Applicant: BAE Systems Controls Inc., Endicott, NY (US)

(72) Inventors: Robert J. Vovos, Vestal, NY (US); James A. Dupuy, Endicott, NY (US)

(73) Assignee: BAE Systems Controls Inc., Endicott, NY (US)

( * ) Notice: Subject to any disclaimer, the term of this patent is extended or adjusted under 35 U.S.C. 154(b) by 217 days.

(21) Appl. No.: 18/141,053

(22) Filed: Apr. 28, 2023

(65) Prior Publication Data
US 2024/0364094 A1   Oct. 31, 2024

(51) Int. Cl.
*H02H 7/26*   (2006.01)
*H02H 1/00*   (2006.01)
*H02H 3/24*   (2006.01)
*H02H 3/087*  (2006.01)

(52) U.S. Cl.
CPC .......... *H02H 7/268* (2013.01); *H02H 1/0015* (2013.01); *H02H 3/243* (2013.01); *H02H 3/087* (2013.01)

(58) Field of Classification Search
CPC .... H02H 7/0268; H02H 1/0015; H02H 3/243; H01H 1/0015
See application file for complete search history.

(56) References Cited

U.S. PATENT DOCUMENTS

| | | |
|---|---|---|
| 2004/0027749 A1 | 2/2004 | Zuercher et al. |
| 2008/0129307 A1 | 6/2008 | Yu et al. |
| 2014/0168843 A1 | 6/2014 | Privitera et al. |
| 2015/0244165 A1* | 8/2015 | Roesner ................ H02H 3/087 |
| | | 361/79 |
| 2016/0282398 A1 | 9/2016 | Zhu et al. |
| 2019/0011492 A1* | 1/2019 | Handy ................ G01R 31/008 |
| 2021/0066904 A1* | 3/2021 | Ionescu ............... H02H 1/0015 |
| 2022/0003820 A1* | 1/2022 | Zhang ................. G01R 31/382 |
| 2022/0006279 A1* | 1/2022 | Robles ............... G01R 31/1272 |

OTHER PUBLICATIONS

International Search Report, PCT/US24/24579, mailed Jul. 12, 2024, 14 pages.

* cited by examiner

*Primary Examiner* — Rexford N Barnie
*Assistant Examiner* — Christopher J Clark
(74) *Attorney, Agent, or Firm* — Scully Scott Murphy & Presser PC; Gary McFaline

(57) ABSTRACT

Methods and systems for arc detection are described. A controller can receive a bus voltage of a direct current (DC) bus connected to an energy source. The controller can determine whether the received bus voltage is less than a bus voltage threshold. The controller can, in response to determining the received bus voltage being less than the bus voltage threshold, determine an occurrence of an arc event in an apparatus that includes the DC bus and the energy source.

17 Claims, 4 Drawing Sheets

ARC DETECTION FOR HIGH VOLTAGE SYSTEM

BACKGROUND

The present application relates to systems and methods for arc detection in high voltage apparatus that includes energy storage systems.

Arc events can be occurrences of electrical arcing in electronic systems. Electrical arcing can occur when a discharge of electricity is produced during an electrical breakdown of gases within the air, and this discharge can be continuous. In an example, when a current's intended path becomes disrupted, the current can travel between two points, either from one conductor to another, or to a grounded object nearby, creating an electrical arc. This conduction of electrical current can be uncontrolled and thus causes various hazardous risks and damages to both humans and hardware components in the electronic system.

SUMMARY

In one embodiment, a method for arc detection is generally described. The method can include receiving a bus voltage of a direct current (DC) bus connected to an energy source. The method can further include determining whether the received bus voltage is less than a bus voltage threshold. The method can further include, in response to determining the received bus voltage being less than the bus voltage threshold, determining an occurrence of an arc event in an apparatus that includes the DC bus and the energy source.

In one embodiment, an apparatus for arc detection is generally described. The apparatus can include an energy source, a controller, and a direct current (DC) bus connected to the energy source and the controller. The controller can be configured to receive a bus voltage of the DC bus. The controller can be further configured to determine whether the received bus voltage is less than a bus voltage threshold. The controller can be further configured to, in response to a determination that the received bus voltage is less than the bus voltage threshold, determine an occurrence of an arc event in the apparatus that includes the DC bus and the energy source.

In one embodiment, a controller for arc detection is generally described. The controller can include a memory and a processor. The memory can be configured to store measurements of a bus voltage of a direct current (DC) bus connected to an energy source. The processor can be configured to receive a bus voltage of the DC bus. The processor can be further configured to generate a bus voltage threshold based on the stored measurements of the bus voltage. The processor can be further configured to determine whether the received bus voltage is less than a bus voltage threshold. The processor can be further configured to, in response to a determination that the received bus voltage being less than the bus voltage threshold, determine an occurrence of an arc event in an apparatus that includes the DC bus and the energy source.

Further features as well as the structure and operation of various embodiments are described in detail below with reference to the accompanying drawings. In the drawings, like reference numbers indicate identical or functionally similar elements.

DETAILED DESCRIPTION

Figure 1:
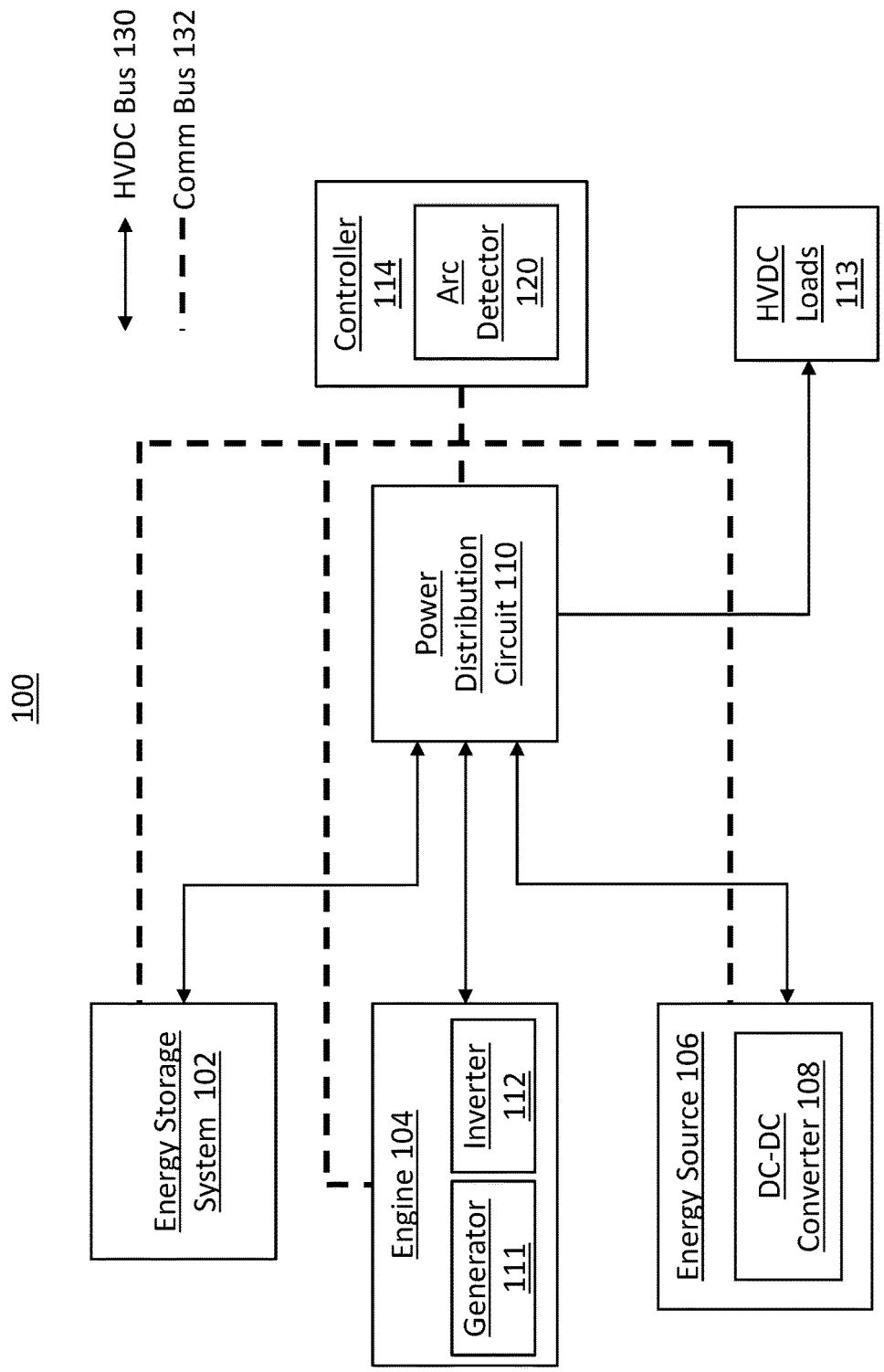
FIG. 1 illustrates an example system that can implement arc detection in high voltage systems in one embodiment.

FIG. 1 illustrates an example apparatus that can implement arc detection in high voltage systems in one embodiment. An apparatus 100 shown FIG. 1. Apparatus 100 can be, for example, a vehicle (e.g., fuel cell vehicle, hybrid electric vehicle, plug-in hybrid electric vehicle, all-electric vehicle), an aircraft, domestic or commercial appliances, or other types of equipment or machinery that utilizes a high-voltage platform (e.g., including components that required relatively high voltage energy, such as more than 60 volts (V) to operate). Apparatus 100 can include at least an energy storage system 102, an engine 104, an energy source 106, a power distribution circuit 110, and a controller 114. Engine 104 an include a generator 111 and an inverter 112. Energy source 106 can include a DC-DC converter 108.

Energy storage system 102 can be configured to store energy that are required for powering components of apparatus 100. In one or more embodiments, energy storage system 102 can be embodied as a multi-cell lithium ion or other suitable battery pack. A high-voltage direct current (HVDC) bus 130 can connect energy storage system 102 to other components, such as power distribution circuit 110, in apparatus 100. HVDC bus can be a bus for transmitting high voltages (e.g., greater than 60V) to components of apparatus 100 that operate on high voltages. Energy storage system 102 can provide electrical energy to a component, such as engine 104, via power distribution circuit 110. Engine 104 can draw DC power from power distribution circuit 110, and can also generate DC power to be provided to power distribution circuit 110 for distribution to components of apparatus 100.

Power distribution circuit 110 can be configured to receive power or energy from energy storage system 102 and/or energy source 106, and distribute DC power (e.g., as direct current (DC) voltage) to different components of apparatus 100. By way of example, power distribution circuit 110 can distribute power to one or more HVDC loads 113, such as inverters and/or converters driving components of apparatus 100 including, but not limited to, air conditioning, motor, battery chargers, or the like. Energy source 106 can be, for example, a source of energy such as a fuel cell. Generator 111 in engine 104 can be configured to convert rotational energy of engine 104 into AC voltage and inverter 112 can convert the AC voltage into DC voltage to be distributed to other components in apparatus 100. The converted DC voltage can be provided to power distribution circuit 110 and can be applied to HVDC bus 130 which in turn provides DC voltage (and power) to components of apparatus 100. DC-DC converter 108 in energy 106 can be used for increasing or decreasing DC power being provided by energy source 106 to a level suitable for use by different components of apparatus 100.

A communication bus 132 (labeled as Comm Bus 132 in FIG. 1) can be a dedicated high speed bus for communicating information associated with components of apparatus 100 to controller 114. In one embodiment, communication bus 132 can be controller area network (CAN) bus. In one embodiment, communication bus 132 can be a bus for transmitting digital signals encoding values representing physical parameters, data, information and/or messages associated with apparatus 100.

Controller 114 can include a plurality of analog and digital circuitry configured to control various hardware components and software applications of apparatus 100. By way of example, controller 114 can be an electronic control unit (ECU) if apparatus 100 is a vehicle. Controller 114 can include one or more circuits implementing computational devices, such as processors (e.g., microprocessors) and memory devices (e.g., read only memory (ROM), random access memory (RAM), electrically-erasable programmable read only memory (EEPROM), or other memory devices). Controller 114 can further include circuitry such as may also clocks, signal generators, analog-to-digital converters (ADC), digital-to-analog converters (DAC), input/output (I/O) circuitry and devices, filters, logic gates such as AND gates, OR gates, latches, or other circuitry. Controller 114 can be programmed with logic and/or program code for executing the methods described herein. Controller 114 can be configured to connect and disconnect energy storage system 102 from HVDC bus 130.

In an aspect, in high voltage systems, an arc can be developed by various types of faults or failure conditions. These faults can include, but not limited to, capacitor failure, cable failure, power electronics failure, or other types of faults. By way of example, a fault such as an insulation breakdown can occur between positive and negative conductors. The fault can form a gap between the positive and negative conductors and an arc can be developed in the gap. If the gap is relatively large, high impedance faults can occur in the high voltage system. Further, since energy storage system 102 and/or energy source 106 can supply energy into the fault, the arc can sustain as long as energy is available from a high voltage bus such as HVDC bus 130.

In one embodiment, controller 114 can include an arc detector 120. Arc detector 120 can be implemented by analog circuitry, digital circuitry, or a combination of analog and digital circuitry. Arc detector 120 can be configured to detect an arc event while apparatus 100 operates in a normal voltage operating range. In response to detecting an arc event, arc detector 120 can output a signal, that can be read by controller 114, and controller 114 can disable or disconnect energy sources (e.g., energy storage system 102 and/or energy source 106) from apparatus 100 to terminate the energy being supplied into the fault. The termination of the energy being supplied into the fault can remove the arc, prevent potential damages to apparatus 100, and prevent hazardous risk to operators or users of apparatus 100. In one or more embodiments, controller 114 can disconnect energy sources by, for example, defueling engine 104, open a DC contactor, trigger a pyro-disconnect device on DC voltage, shut down a fuel cell engine, or the like.

Arc detector 120 can compare a measurement of a DC bus voltage of HVDC bus 130 with a bus voltage threshold to determine an occurrence of an arc event, and to determine whether to terminate a supply of energy by disconnecting energy storage system 1002 and/or energy source 106. In one embodiment, the bus voltage threshold can be set to half of a previous measurement of the DC bus voltage of HVDC bus 130. In an aspect, the bus voltage threshold can be set to half of the previous measured DC bus voltage because maximum power transfer occurs when arc voltage is half of system voltage, and the arc would tend to self-extinguish if its impedance exceeds source impedance. The comparison of a measured bus voltage with a fraction of a previous measurement of the bus voltage can allow arc detector 120 to determine whether bus voltage of HVDC bus 130 is experiencing a sudden drop. A sudden drop of the bus voltage can be an indication that there is anomaly in apparatus 100 that causes unexpected amount of power to be drawn from HVDC bus 130. For example, an occurrence of an arc event that develops an arc can draw power from HVDC bus 130.

Figure 2:
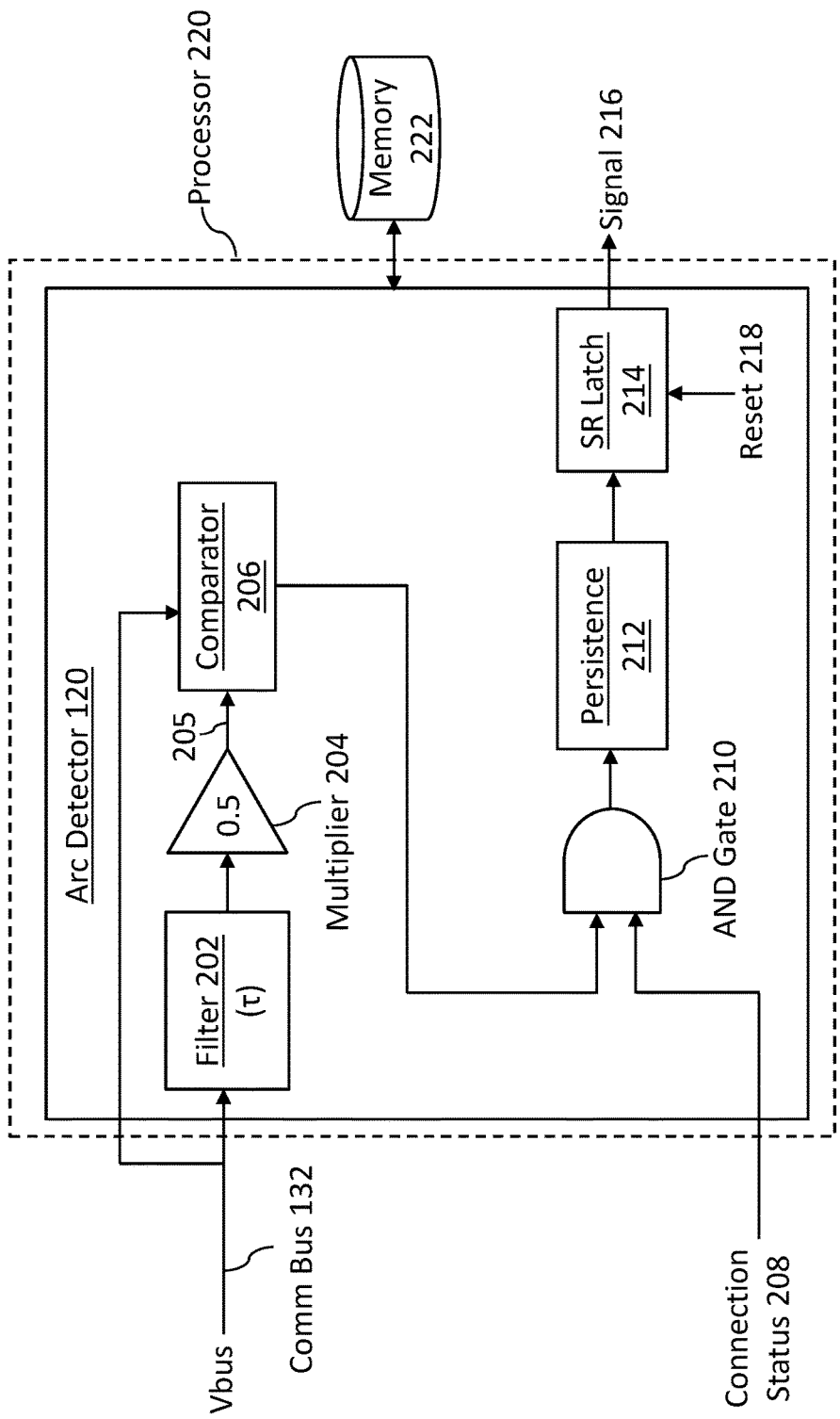
FIG. 2 illustrates an example of an arc detector in one embodiment.

FIG. 2 illustrates an example of an arc detector in one embodiment. An example embodiment of arc detector 120 is shown in FIG. 2. Controller 114 can include arc detector 120, and arc detector can include filter 202, a multiplier 204, a comparator 206, one or more logic gates such as an AND gate 210, a persistency block 212, and one or more logic circuits such as an SR latch 214. Arc detector 120 can receive a bus voltage of HVDC bus 130 (in FIG. 1) from communication bus 132. In one embodiment, components of arc detector 120 can be a part of a processor 220 of controller 114.

Filter 202 can receive Vbus from communication bus 132. The received bus voltage Vbus can be a digital value representing a measurement of Vbus in present time. In one embodiment, communication bus 132 can be a CAN bus such that arc detector 120 can receive Vbus as part of a data packet under the CAN protocol. In one embodiment, if arc detector is implemented by program code being executed by controller 114, filter 202 can be a digital filter such as a finite impulse response (FIR) filter. In another embodiment, if arc detector 120 is implemented by analog components, filter 202 can be a low pass filter and a DAC can receive the digital value representing Vbus from communication bus 132 and convert Vbus into analog signal for the low pass filter.

An output of filter 202 can be fed to a multiplier 204. In one embodiment, filter 202 can accumulate previous measurements of Vbus and store the accumulated previous measurements of Vbus. By way of example, filter 202 can be configured to accumulate measurements of Vbus within a past time interval τ (e.g., 1 second, 400 millisecond, etc.). In one embodiment, filter 202 can determined and store an average of the accumulated measurements of Vbus within the past time interval τ. In one embodiment, filter 202 can delay the input of Vbus based on the previous time interval τ to implement the accumulation and storing of previous measurements of Vbus. The output of filter 202 being fed to multiplier 204 can be a historical or previous value within the past time interval τ, and multiplier 204 can reduce the output of filter 202 by a factor. In the example shown in FIG. 2, multiplier 204 can reduce the output of filter 202 by half (e.g., multiplied by 0.5), to generate a bus voltage threshold 205 that is half of a previous measurement of Vbus (or half of an average of Vbus in the past time interval τ). In one embodiment, filter 202 can store measurements of Vbus in memory 222 of controller 114.

As a result of setting T to a predetermined time interval, and based on delays that may be applied by filter 202 and multiplier 204 on Vbus, comparator 206 can receive Vbus from communication bus 132, and can receive the bus voltage threshold 205 from multiplier 204. Comparator 206 can compare Vbus with bus voltage threshold 205. If the comparison indicates Vbus is greater than bus voltage threshold 205, then arc detector 120 can determine an absence of an arc event (or occurrence of an arc event is unlikely). In response to the absence of the arc event, comparator 206 can output a logic zero to AND gate 210 and AND gate 210 will also output a zero, and apparatus 100 (in FIG. 1) can continue its operation. The implementation of filter 202 as a low pass filter can provide a history of Vbus to separate the present measurement of Vbus from the historical Vbus values such that the present measurement of Vbus can be compared with the historical Vbus values at comparator 206.

If the comparison indicates Vbus is less than bus voltage threshold 205, then arc detector 120 can determine a presence of an arc event (or occurrence of an arc event is likely). In response to the presence of the arc event, comparator 206 can output a logic one to AND gate 210. AND gate 210 can also receive a connection status 208 that indicated whether one or more energy sources (e.g., energy storage system 102, energy source 106 in FIG. 1, or other energy source) are connected to HVDC bus 130. If connection status 208 indicate that no energy source is connected to HVDC bus 130 (e.g., connection status 208 being a logic zero), AND gate 210 can output a zero despite comparator 206 outputting a logic one. If connection status 208 indicate that at least one energy source is connected to HVDC bus 130 (e.g., connection status 208 being a logic one), AND gate 210 can output a logic one since comparator 206 also outputted a logic one.

The logic one output from AND gate 210 can be provided to persistency block 212. In one embodiment, persistency block 212 can be a circuit configured to determine whether the presence of the arc event is persistent for a certain amount of time. By way of example, arc detector 120 can receive X measurements of Vbus within one second and comparator 206 can output X binary signals within the one second. If none of the X binary signals, or a relatively small portion (e.g., below a certain percentage) of the X binary signal, indicate an absence of the arc event, then persistency block 212 can determine that any potential arc event is resolved and there may be no potential risk of damages.

If all of the X binary signals, or a relatively large portion (e.g., a continuous string of logic one signals, or more than a certain percentage) of the X binary signal, indicate the presence of the arc event, then persistency block 212 can determine that the arc event is sufficiently persistent to cause potential damages. In response to persistency block 212 determining the persistency of the arc event, SR latch 214 can be set and a signal 216 can be outputted to processor 220 or controller 114. Signal 216 can be a signal indicating a need to disconnect energy sources that are connected to HVDC bus 130 (as indicated by connection status 208). Controller 114 or processor 220 can receive signal 216 and disconnect the energy sources connected to HVDC bus 130. In one embodiment, controller 114 can also defuel engine 104 (in FIG. 1) in response to receiving signal 216 to prevent engine 104 from supplying power to the arc event.

In an aspect, maximum energy transfer during an arc event can occur when an arc voltage is half of an open circuit voltage (Voc) of HVDC bus 130, and weak low impedance arcs can have a voltage less than half of Voc. Therefore, the comparison of Vbus with a bus voltage of half of a previous measurement of Vbus can allow arc detector 120 to function as a high pass filter that detects whether Vbus is experiencing a sudden drop, where sudden drop can indicate an occurrence of an arc event.

Arc detector 120 can be implemented in a relatively simple manner when compared to conventional techniques. For example, arc detector 120 utilized measurements of Vbus that is readily available from communication bus 132 (e.g., a CAN bus) since existing power management or distribution chips in apparatus 100 utilizes the same Vbus measurement. Arc detector 120 may not need to rely on analog measurements of current being drawn, hence avoiding a need to add physical components that may require circuit board space. Arc detector 120 is also flexible in terms of implementation, as it can be implemented as software, hardware, or a combination of software and hardware.

Figure 3:
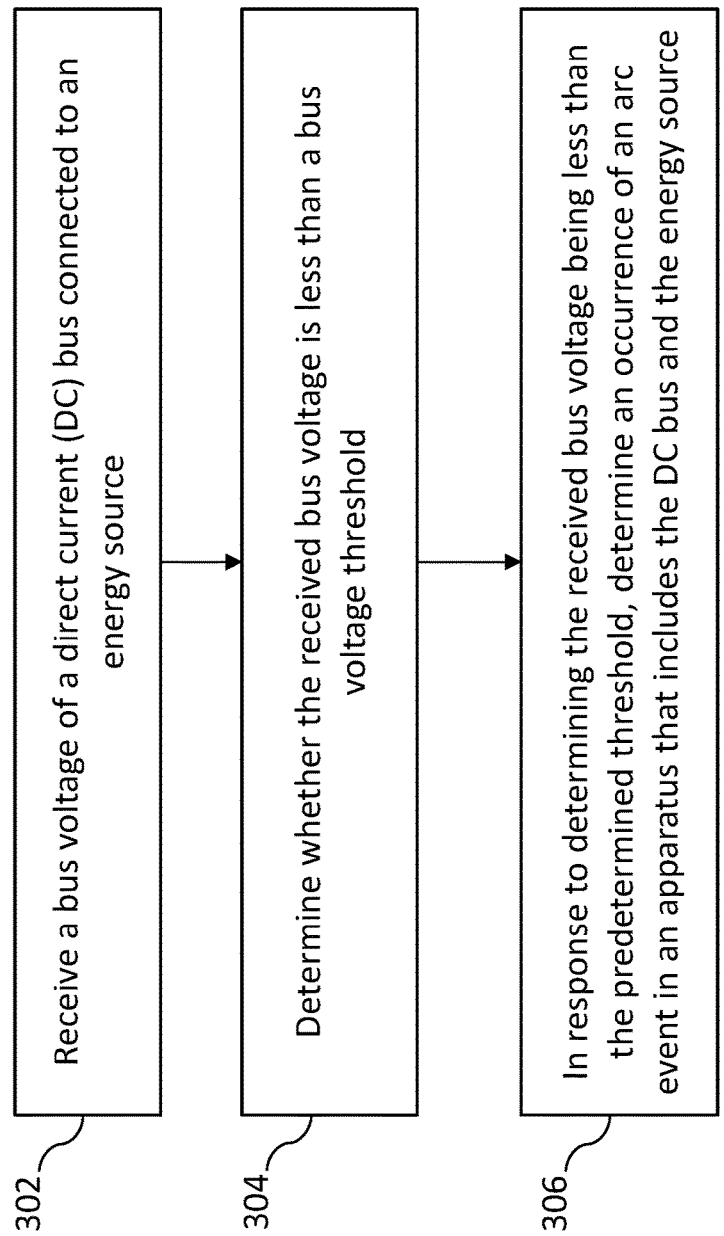
FIG. 3 illustrates a flow diagram for performing arc detection in high voltage systems in one embodiment.

FIG. 3 illustrates a flow diagram for performing arc detection in high voltage systems in one embodiment. The process 300 in FIG. 3 may be implemented by controller 114 as discussed above. The process 300 can include one or more operations, actions, or functions as illustrated by one or more of blocks 302, 304 and/or 306. Although illustrated as discrete blocks, various blocks may be divided into additional blocks, combined into fewer blocks, eliminated, performed in different order, or performed in parallel, depending on the desired implementation.

Process 300 can be performed by controller 114 shown in FIG. 1 and FIG. 2. Process 300 can begin at block 302. At block 302, a controller can receive a bus voltage of a direct current (DC) bus connected to an energy source. In one embodiment, the bus voltage can be received from a controller area network (CAN) bus connected to the energy source.

Process 300 can proceed from block 302 to block 304. At block 304, the controller can determine whether the received bus voltage is less than a bus voltage threshold. In one embodiment, the bus voltage threshold can be half of a previous measurement of the bus voltage. In one embodiment, the controller can store a previous measurement of the bus voltage and set half of the previous measurement of the bus voltage as the bus voltage threshold. In one embodiment, the controller can compare the bus voltage with half of the previous measurement of the bus voltage to determine whether the bus voltage of the communication bus is less than the bus voltage threshold. In one embodiment, the controller can filter the previous measurement of the bus voltage and reduce the filtered previous measurement of the bus voltage to half of the previous measurement of the bus voltage.

Process 300 can proceed from block 304 to block 306. At block 306, the controller can, in response to determining the received bus voltage being less than the bus voltage threshold, determine an occurrence of an arc event in an apparatus that includes the DC bus and the energy source. In one embodiment, the controller can determine a connection status of the energy source to the DC bus. In response to the determination that the received bus voltage is less than the bus voltage threshold, and in response to the connection status indicating the energy source is connected to the DC bus, the controller can disconnect the energy source from the DC bus.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
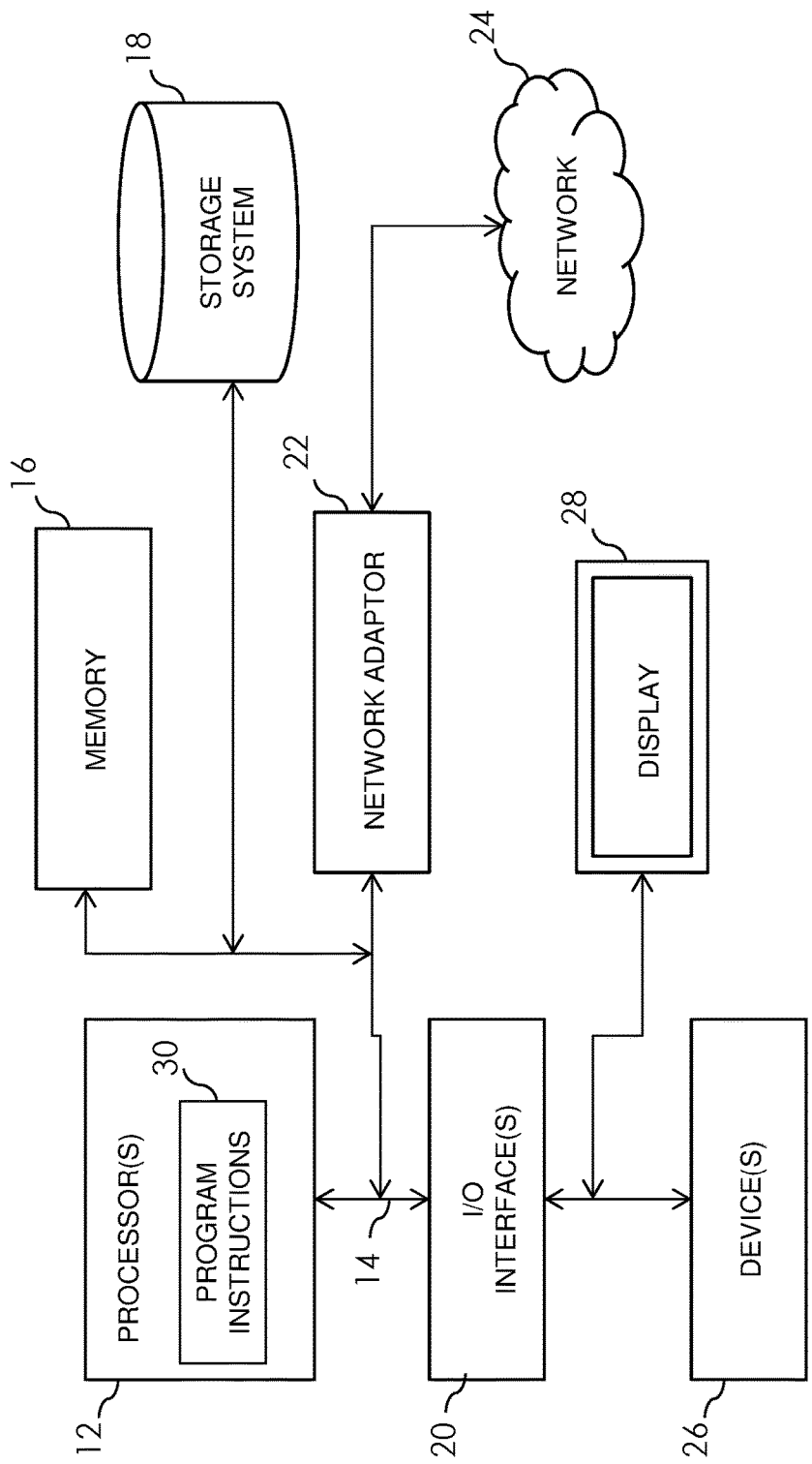
FIG. 4 illustrates a schematic of an example computer or processing system that may implement a system in one embodiment.

FIG. 4 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnects (PCI) bus, and/or other bus in vehicle computing systems such as controller area network (CAN) bus, local interconnect network (LIN) bus, FlexRay bus, or other types of bus in vehicle computing systems.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a bus voltage of a direct current (DC) bus connected to an energy source;
   determining whether the received bus voltage is less than a bus voltage threshold;
   in response to determining the received bus voltage being less than the bus voltage threshold, determining an occurrence of an arc event in an apparatus that includes the DC bus and the energy source;

determining a connection status of the energy source to the DC bus; and in response to determining the received bus voltage is less than the bus voltage threshold, and in response to the connection status indicating the energy source is connected to the DC bus, disconnecting the energy source from the DC bus.

2. The method of claim 1, wherein the bus voltage threshold is half of a previous measurement of the bus voltage.

3. The method of claim 1, further comprising:
storing a previous measurement of the bus voltage; and
setting half of the previous measurement of the bus voltage as the bus voltage threshold.

4. The method of claim 3, wherein determining whether the bus voltage of the DC bus is less than the bus voltage threshold comprises comparing the bus voltage with half of the previous measurement of the bus voltage to determine whether the bus voltage of the DC bus is less than the bus voltage threshold.

5. The method of claim 3, further comprising:
filtering the previous measurement of the bus voltage; and
reducing the filtered previous measurement of the bus voltage to half of the previous measurement of the bus voltage.

6. The method of claim 1, wherein the bus voltage is received from a controller area network (CAN) bus connected to the energy source.

7. An apparatus comprising:
an energy source;
a controller;
a direct current (DC) bus connected to the energy source and the controller;
the controller being configured to:
receive a bus voltage of the DC bus;
determine a connection status between the energy source and the DC bus;
determine whether the received bus voltage is less than a bus voltage threshold;
in response to a determination that the received bus voltage is less than the bus voltage threshold, determine an occurrence of an arc event in the apparatus that includes the DC bus and the energy source; and
in response to the determination that the received bus voltage is less than the bus voltage threshold, and in response to the connection status indicating the energy source is connected to the DC bus, disconnect the energy source from the DC bus.

8. The apparatus of claim 7, wherein the bus voltage threshold is half of a previous measurement of the bus voltage.

9. The apparatus of claim 7, wherein the controller is configured to:
store a previous measurement of the bus voltage; and
set half of the previous measurement of the bus voltage as the bus voltage threshold.

10. The apparatus of claim 9, wherein the controller is configured to compare the bus voltage with half of the previous measurement of the bus voltage to determine whether the bus voltage of the DC bus is less than the bus voltage threshold.

11. The apparatus of claim 9, wherein the controller is configured to:
filter the previous measurement of the bus voltage; and
reduce the filtered previous measurement of the bus voltage to half of the previous measurement of the bus voltage.

12. The apparatus of claim 7, wherein the controller is configured to receive the bus voltage from a controller area network (CAN) bus connected to the energy source.

13. A controller comprising:
a memory device configured to store measurements of a bus voltage of a direct current (DC) bus connected to an energy source;
a processor configured to:
receive a bus voltage of the DC bus;
generate a bus voltage threshold based on the stored measurements of the bus voltage;
determine whether the received bus voltage is less than a bus voltage threshold;
determine a connection status of the energy source to the DC bus;
in response to a determination that the received bus voltage being less than the bus voltage threshold, determine an occurrence of an arc event in an apparatus that includes the DC bus and the energy source; and
in response to a determination that the received bus voltage is less than the bus voltage threshold, and in response to the connection status indicating the energy source is connected to the DC bus, generate a signal to disconnect the energy source from the DC bus.

14. The controller of claim 13, wherein:
the stored measurements of the bus voltage comprise measurements of the bus voltage obtained in a predetermined amount of historical time; and
the bus voltage threshold is half of the stored measurements of the bus voltage obtained in a predetermined amount of historical time.

15. The controller of claim 13, wherein the processor is configured to compare the bus voltage with the bus voltage threshold to determine whether the bus voltage of the DC bus is less than the bus voltage threshold.

16. The controller of claim 13, wherein the processor is configured to:
filter the stored measurements of the bus voltage; and
reduce the filtered stored measurement of the bus voltage to half to generate the bus voltage threshold.

17. The controller of claim 13, wherein the bus voltage is received from a controller area network (CAN) bus connected to the energy source.

* * * * *